(12) United States Patent
Peede

(10) Patent No.: US 7,650,713 B1
(45) Date of Patent: Jan. 26, 2010

(54) FISHING POLE HOLDING DEVICE

(76) Inventor: Joseph W. Peede, 1414 Ashburton Rd., Raleigh, NC (US) 27606

( * ) Notice: Subject to any disclaimer, the term of this patent is extended or adjusted under 35 U.S.C. 154(b) by 82 days.

(21) Appl. No.: 11/706,695

(22) Filed: Feb. 16, 2007

(51) Int. Cl.
*A01K 97/10* (2006.01)
(52) U.S. Cl. .......................................... 43/21.2; 43/54.1
(58) Field of Classification Search .................. 43/21.2, 43/54.1; 248/520; 206/315.11
See application file for complete search history.

(56) References Cited

U.S. PATENT DOCUMENTS

| | | | | | |
|---|---|---|---|---|---|
| 1,318,007 | A | * | 10/1919 | Gau | 312/244 |
| 2,264,744 | A | * | 12/1941 | Dunnam | 312/235.4 |
| 2,555,073 | A | * | 5/1951 | Zdankoski | 43/55 |
| 2,596,403 | A | * | 5/1952 | Hoffman | 43/21.2 |
| 3,095,663 | A | * | 7/1963 | Miller | 43/21.2 |
| 3,128,137 | A | * | 4/1964 | Dokter | 312/235.4 |
| 3,555,719 | A | * | 1/1971 | Butler | 43/54.1 |
| 3,851,916 | A | | 12/1974 | Quartullo | |
| 3,947,991 | A | * | 4/1976 | Morcom | 43/54.1 |
| 4,128,170 | A | * | 12/1978 | Elliott | 206/315.11 |
| 4,645,167 | A | * | 2/1987 | Hardwick | 248/520 |
| 4,700,502 | A | * | 10/1987 | McFarland et al. | 43/21.2 |
| 4,745,704 | A | * | 5/1988 | Schaefer | 43/54.1 |
| 4,841,660 | A | * | 6/1989 | James | 43/21.2 |
| 4,999,943 | A | * | 3/1991 | Crabtree | 43/54.1 |
| 5,347,746 | A | * | 9/1994 | Letson | 43/57.1 |
| 5,481,822 | A | * | 1/1996 | Engels | 43/54.1 |
| 5,560,145 | A | * | 10/1996 | Anderson | 43/54.1 |
| D390,308 | S | | 2/1998 | Sieland et al. | |
| 5,987,804 | A | | 11/1999 | Shearer et al. | |
| 6,681,517 | B1 | | 1/2004 | Solomon | |
| 2005/0126064 | A1 | * | 6/2005 | Winkler | 43/21.2 |
| 2006/0048437 | A1 | | 3/2006 | Sandman, Jr. | |

* cited by examiner

*Primary Examiner*—Kurt Rowan

(57) ABSTRACT

A fishing pole holding device for holding fishing poles adjacent a seat of a boat while the fishing poles are being used to fish includes a box being positionable on a deck of a boat. The box has an aperture extending through a top wall and a bottom wall of the box. The aperture receives a pedestal of a seat wherein the box is positioned between the seat and the deck. The box includes a peripheral wall extending between the top wall and the bottom wall. A plurality of pole sleeves is coupled to the box. Each of the pole sleeves receives a handle of one of the fishing poles to permit the fishing poles to extend from the associated one of the pole sleeves when the fishing poles are is used.

1 Claim, 7 Drawing Sheets

US 7,650,713 B1

FISHING POLE HOLDING DEVICE

BACKGROUND OF THE INVENTION

1. Field of the Invention

The present invention relates to fishing rod holders and more particularly pertains to a new fishing rod holder for holding fishing poles adjacent a seat of a boat while the fishing poles are being used to fish.

2. Description of the Prior Art

The use of fishing rod holders is known in the prior art. While these devices fulfill their respective, particular objectives and requirements, the need remains for a device that certain improved features that allow the device to be positioned between a seat and a deck of a boat as well as around a pedestal of the seat to minimize interference of the device with a person sitting on the seat. Additionally, the device should also include tie downs to allow the device to be anchored to the boat and inhibit rotation of the device around the pedestal.

SUMMARY OF THE INVENTION

The present invention meets the needs presented above by generally comprising a box being positionable on a deck of a boat. The box has an aperture extending through a top wall and a bottom wall of the box. The aperture receives a pedestal of a seat wherein the box is positioned between the seat and the deck. The box includes a peripheral wall extending between the top wall and the bottom wall. A plurality of pole sleeves is coupled to the box. Each of the pole sleeves receives a handle of one of the fishing poles to permit the fishing poles to extend from the associated one of the pole sleeves when the fishing poles are is used.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
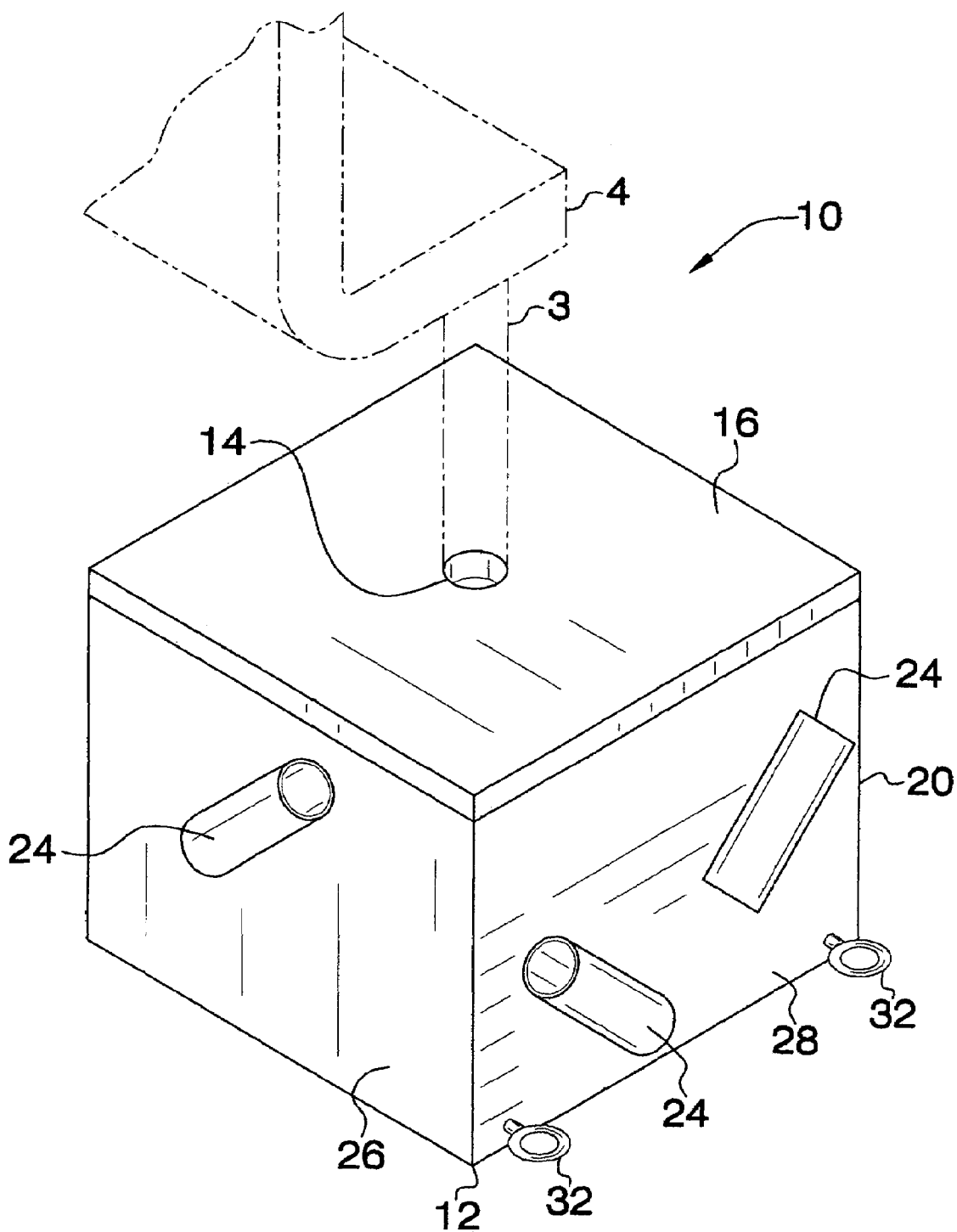
FIG. 1 is a perspective view of a fishing pole holding device according to the present invention.
Figure 2:
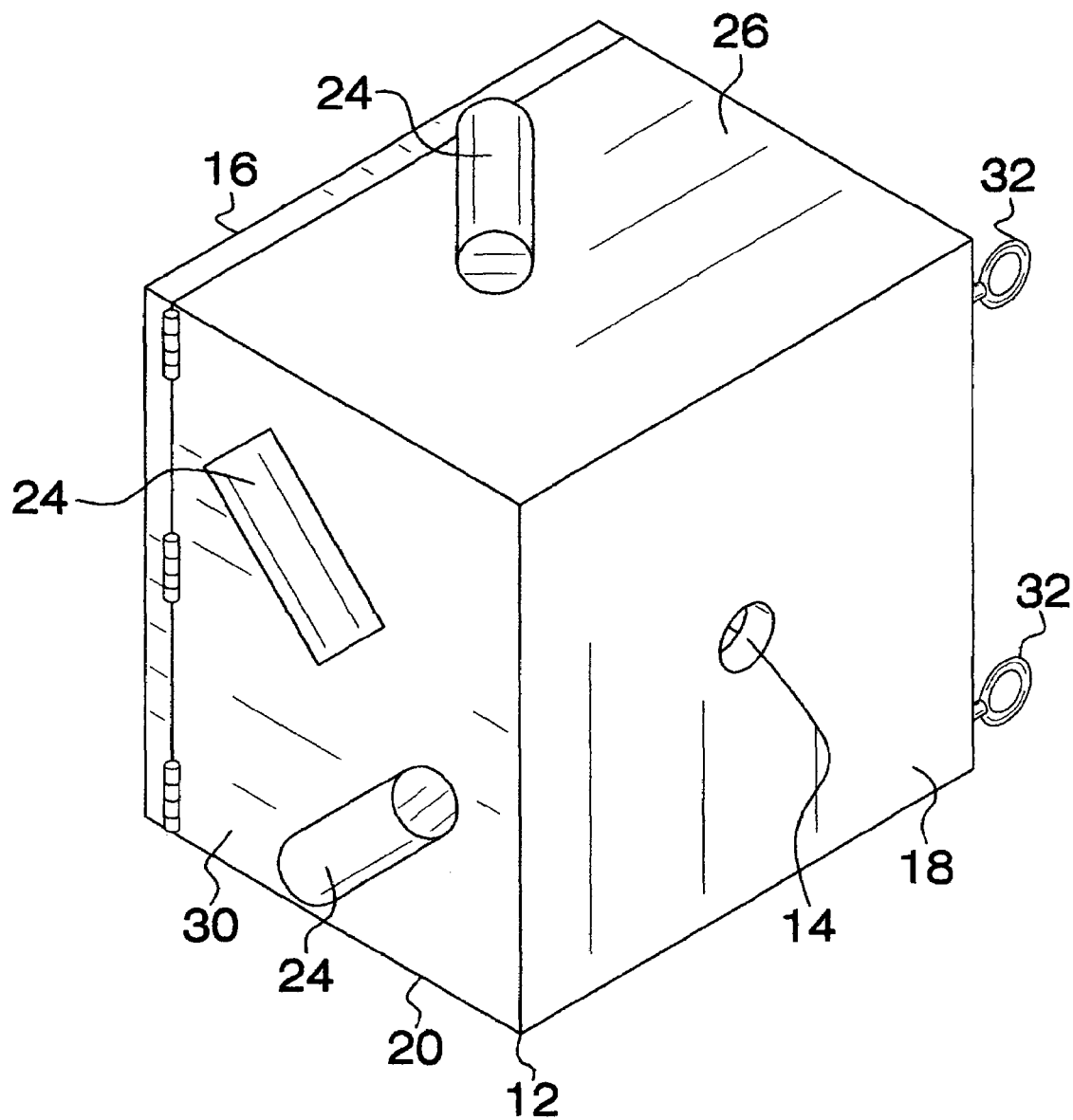
FIG. 2 is a bottom perspective view of the present invention.
Figure 3:
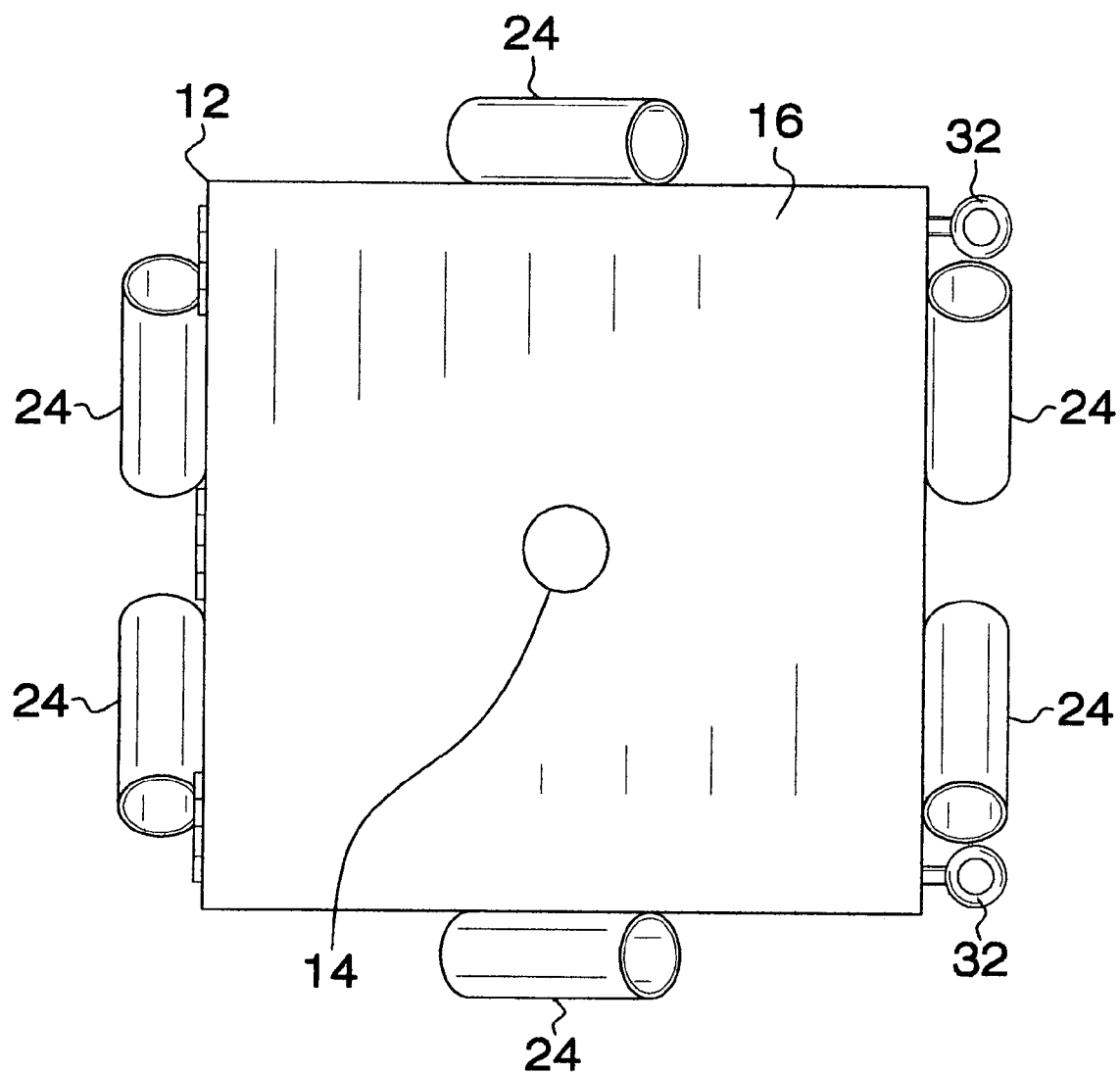
FIG. 3 is a top view of the present invention.
Figure 4:
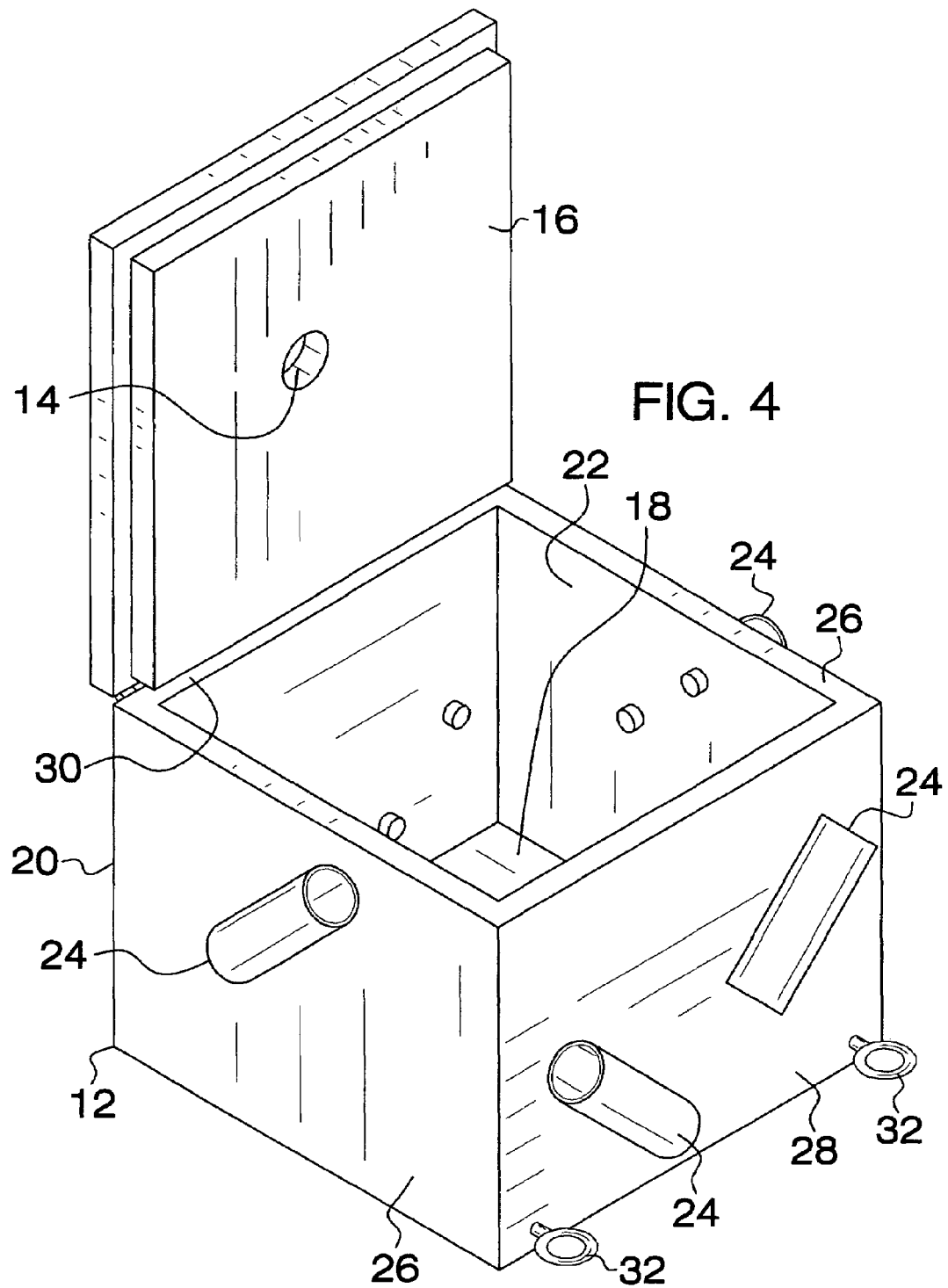
FIG. 4 is a perspective view of the present invention with a top wall pivoted away from a peripheral wall.
Figure 5:
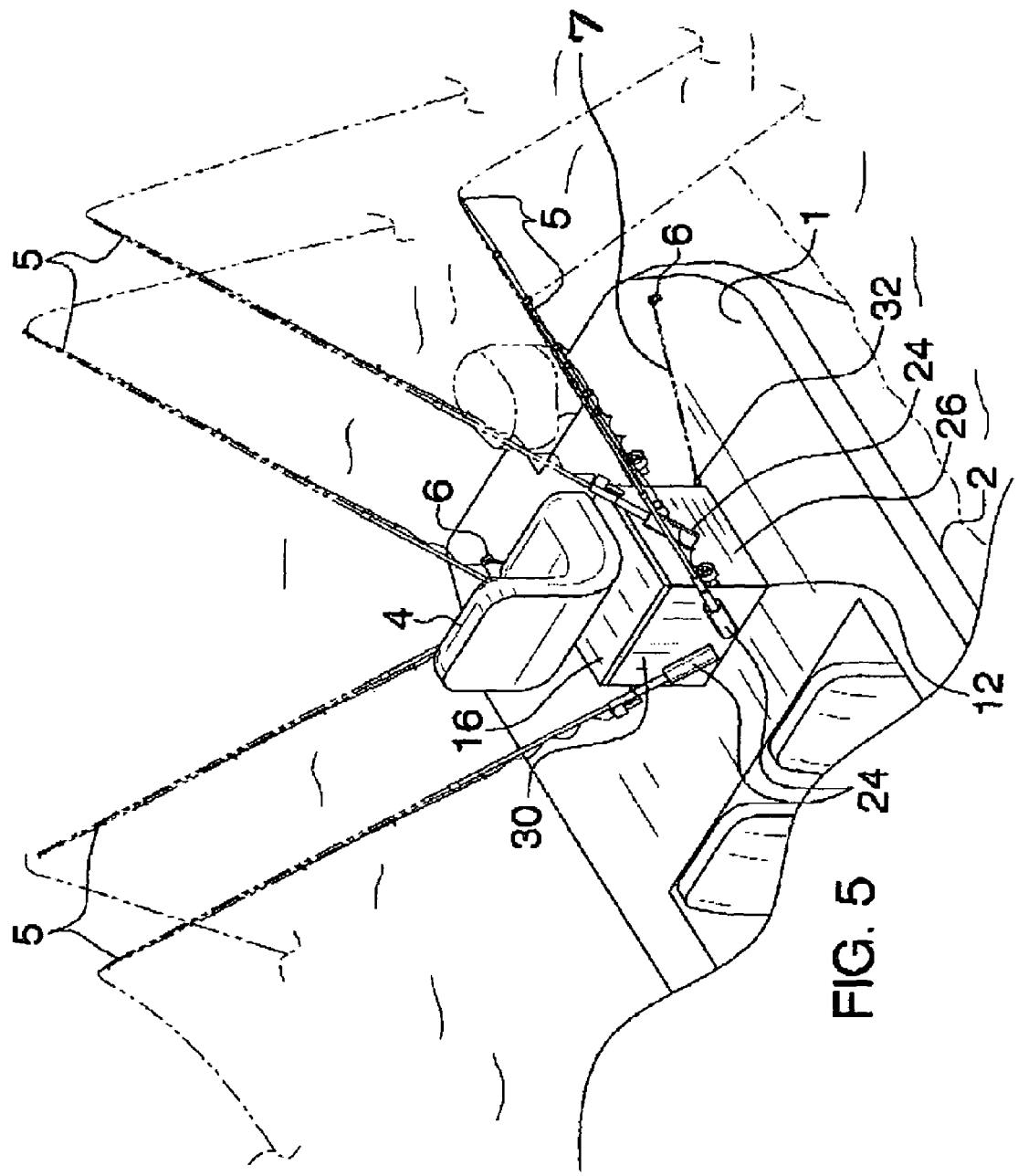
FIG. 5 is a perspective view of the present invention shown in use.

With reference now to the drawings, and in particular to FIGS. 1 through 7 thereof, a new fishing rod holder embodying the principles and concepts of the present invention and generally designated by the reference numeral 10 will be described.

As best illustrated in FIGS. 1 through 7, the fishing pole holding device 10 generally comprises a box 12 being positionable on a deck 1 of a boat 2. The box 12 has an aperture 14 extending through a top wall 16 and a bottom wall 18 of the box 12. The aperture 14 receives a pedestal 3 of a seat 4 wherein the box 12 is positioned between the seat 4 and the deck 1. The box 12 includes a peripheral wall 20 extending between the top wall 16 and the bottom wall 18. The top wall 16 is hingedly coupled to the peripheral wall 20. The top wall 16 is pivoted away from the peripheral wall 20 to permit access to an interior space 22 of the box 12 when the box 12 is removed from the pedestal 3.

A plurality of pole sleeves 24 is coupled to the box 12. Each of the pole sleeves 24 receives a handle of one of a plurality of fishing poles 5 to permit the fishing poles 5 to extend from the associated one of the pole sleeves 24 when the fishing poles 5 are being used. Each of a pair of end walls 26 of the peripheral wall 20 has one of the pole sleeves 24 coupled thereto. A front wall 28 of the peripheral wall 20 has a pair of the pole sleeves 24 coupled thereto. A rear wall 30 has a pair of the pole sleeves 24 coupled thereto. The pole sleeves 24 coupled to the end walls 26 are positioned at an elevation higher than the pole sleeves 24 coupled to the front wall 28 and the rear wall 30 to inhibit contact between the fishing poles 5 in the pole sleeves 24. Each of the pole sleeves 24 is positioned at an angle between approximately 40 degrees and approximately 50 degrees from vertical. Each of the pair of the pole sleeves 24 on the front 28 and rear 30 walls angles oppositely of each other. Each of the pole sleeves 24 coupled to the end walls 26 is angled in the same direction.

A pair of tie downs 32 is coupled to the box 12. Each of the tie downs 32 receives a rope 7 from one of a plurality of anchoring points 6 of the boat 2 to inhibit pivoting of the box 12 around the pedestal 3. Each of the tie downs 32 is coupled to the front wall 28 and is positioned adjacent the bottom wall 18.

Figure 6:
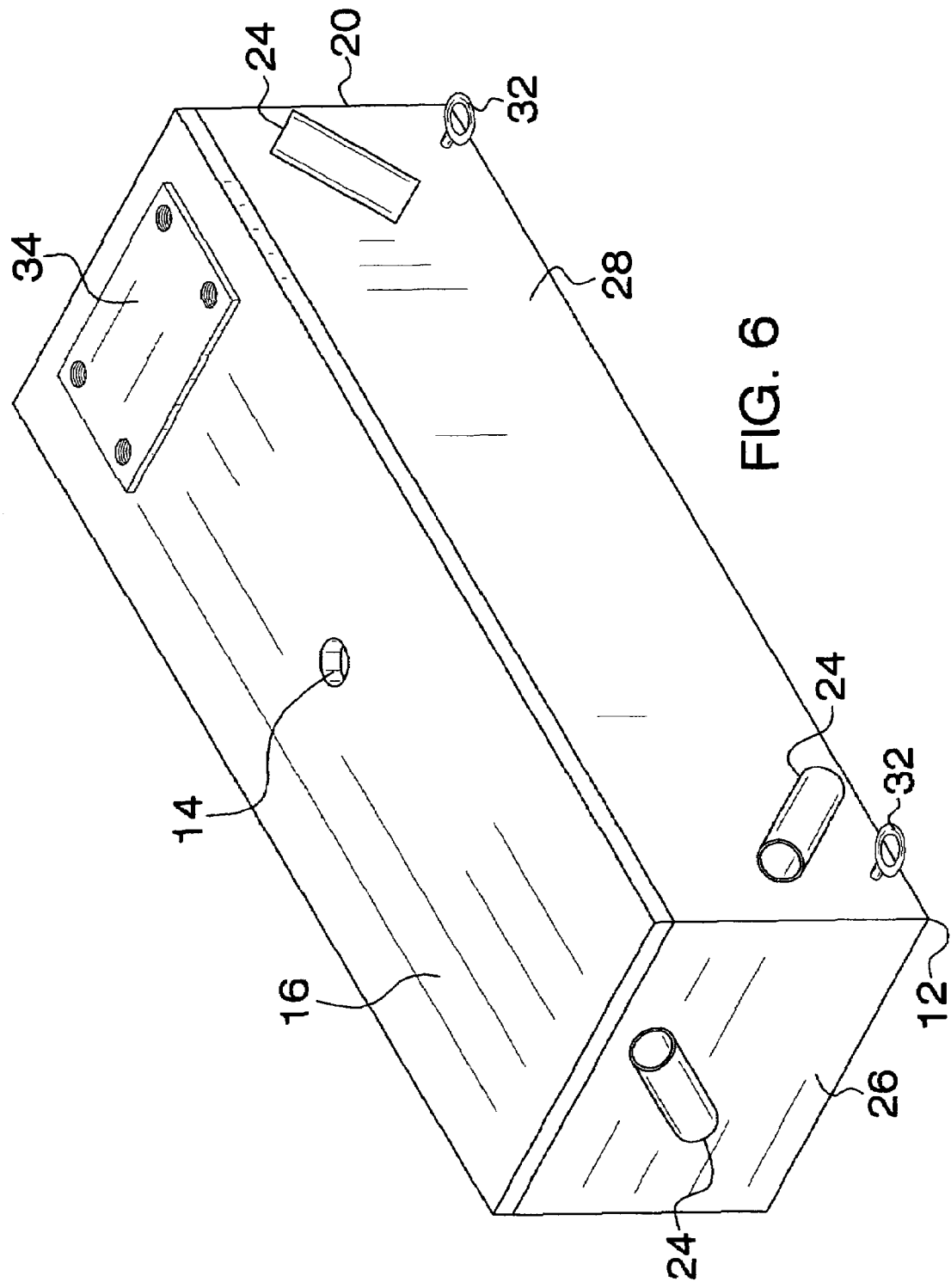
FIG. 6 is a perspective view of an embodiment of the present invention.
Figure 7:
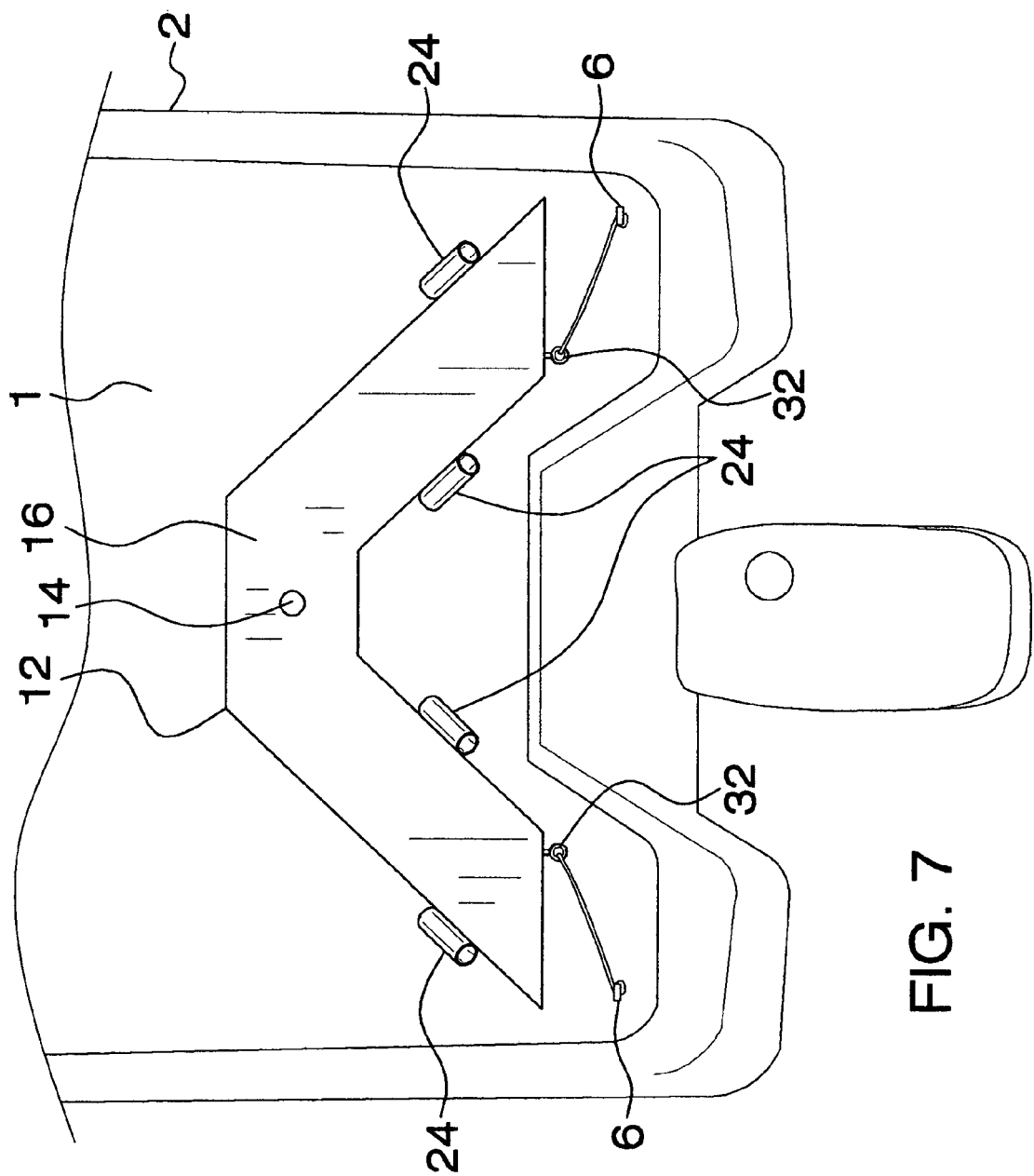
FIG. 7 is a top view of an embodiment of the present invention shown in use on a boat.

In an embodiment, as shown in FIG. 6, the box 12 is elongated to position each of the end walls 26 of the peripheral wall 20 adjacent a gunwale of the boat 2 on the port and starboard sides of the boat 2. At least one downrigger mount 34 is coupled to the top wall 16 of the box 12. The at least one downrigger mount 34 receives a downrigger to secure the downrigger to the box 12. In an embodiment, as shown in FIG. 7, the box 12 is approximately V-shaped to permit the box 12 to more closely match the shape of a stern of the boat 2.

In use, the seat 4 is removed from the pedestal 3 and the box 12 is placed over the pedestal 3 with the pedestal 3 extending through the aperture 14. The seat 4 is reattached to the pedestal 3 with the box 12 positioned between the seat 4 and the deck 1. The tie downs 32 receive the ropes from the anchoring points 6 of the boat 2 to inhibit the box 12 from rotating around the pedestal 3. The handles of the fishing poles 5 are placed into the pole sleeves 24 to allow several fishing poles 5 to be used for fishing simultaneously.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing pole holding device for holding fishing poles while fishing, said device comprising:

a box being positionable on a deck of a boat, said box having an aperture extending through a top wall and a bottom wall of said box, said aperture receiving a pedestal of a seat wherein said box is positioned between the seat and the deck, said box including a peripheral wall extending between said top wall and said bottom wall, said top wall being hingedly coupled to said peripheral wall, said top wall being pivoted away from said peripheral wall to permit access to an interior space of said box when said box is removed from the pedestal;

a plurality of pole sleeves being coupled to said box, each of said pole sleeves receiving a handle of one of the fishing poles to permit the fishing poles to extend from the associated one of said pole sleeves when the fishing poles are being used, each of a pair of end walls of said peripheral wall having one of said pole sleeves coupled thereto, a front wall of said peripheral wall having a pair of said pole sleeves coupled thereto, a rear wall having a pair of said pole sleeves coupled thereto, said pole sleeves coupled to said end walls being positioned at an elevation higher than said pole sleeves coupled to said front wall and said rear wall to inhibit contact between the fishing poles in said pole sleeves, each of said pole sleeves being positioned at an angle between approximately 40 degrees and approximately 50 degrees from vertical, each of said pair of said pole sleeves on said front and rear walls angling oppositely of each other, each of said pole sleeves coupled to said end walls being angled in the same direction; and a pair of tie downs being coupled to said box, each of said tie downs receiving a rope from one of a plurality of anchoring points of the boat to inhibit pivoting of said box around the pedestal, each of said tie downs being coupled to said front wall and being positioned adjacent said bottom wall.

* * * * *